United States Patent [19]

Boothman et al.

[11] 4,072,997
[45] Feb. 7, 1978

[54] OVERTEMPERATURE PROTECTIVE CIRCUIT FOR SWITCHING DEVICES

[75] Inventors: David Richard Boothman, Ennismore; Robert Henry Rehder; Everett Charles Elgar, both of Peterborough, all of Canada

[73] Assignee: Canadian General Electric Company Limited, Toronto, Canada

[21] Appl. No.: 730,856

[22] Filed: Oct. 8, 1976

[30] Foreign Application Priority Data

Dec. 18, 1975 Canada ................................ 242342

[51] Int. Cl.[2] .............................................. H02H 5/04
[52] U.S. Cl. ..................................... 361/103; 361/24
[58] Field of Search ..................... 361/24, 25, 30, 37, 361/103; 323/68

[56] References Cited

U.S. PATENT DOCUMENTS

| | | | |
|---|---|---|---|
| 3,643,130 | 2/1972 | Liska et al. | 361/103 |
| 3,808,503 | 4/1974 | Hentschel | 361/30 |
| 3,808,516 | 4/1974 | Hentschel | 323/68 |
| 3,845,354 | 10/1974 | Boothman et al. | 361/24 |

OTHER PUBLICATIONS

"Thermal Tracking-A rational Approach to Motor Protection", IEEE Paper, T 74 029.5, 11/73.

*Primary Examiner*—Harry E. Moose, Jr.
*Attorney, Agent, or Firm*—Raymond A. Eckersley

[57] ABSTRACT

A circuit for monitoring the temperature of the contacts of an electrical switching device (such as a circuit breaker), comprises an electrical analogue circuit of the thermal characteristics of the switching device. The analogue circuit comprises electrical resistance and capacitance, interconnected so as to form an electrical model of the heat flow paths and capacitances respectively, in the switching device. The preferred embodiment also provides a temperature sensing device to introduce to the analogue circuit a voltage signal the magnitude of which is proportional to the exterior temperature of the switching device. The analogue circuit is connected in a series circuit relationship with a current controller. The current controller controls the amount of current flowing through the analogue circuit. The current controller is in turn controlled by a voltage control signal proportional to the amount of current being carried by the switching device. The current controller is operated in such a fashion that the current it lets flow through the analogue circuit is proportional to the square of the voltage control signal.

10 Claims, 3 Drawing Figures

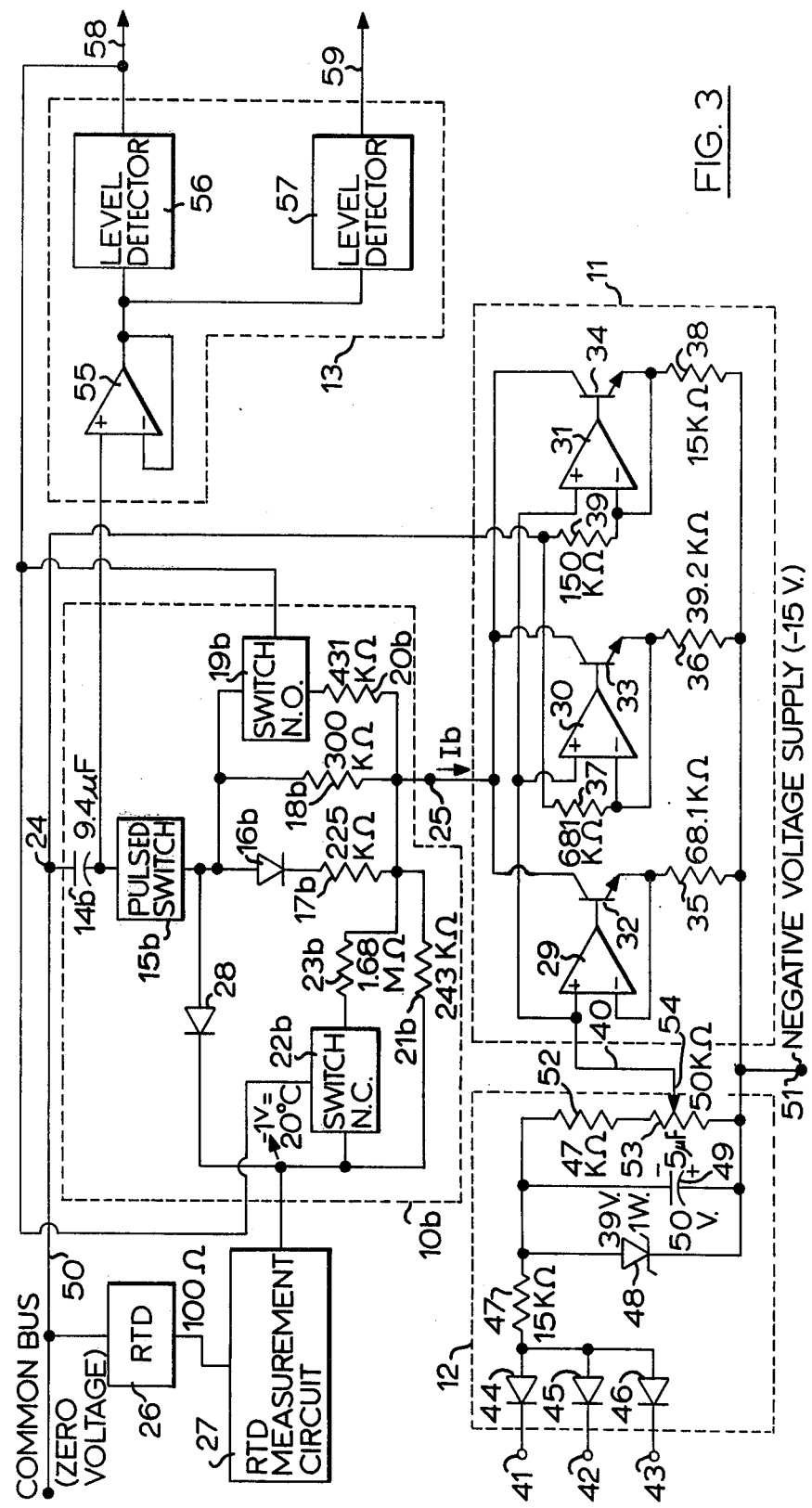

OVERTEMPERATURE PROTECTIVE CIRCUIT FOR SWITCHING DEVICES

BACKGROUND OF THE INVENTION

This invention relates to a circuit for monitoring temperatures of electrical switching devices, and in particular the temperature of the contacts in circuit breakers.

As with most equipment used in the electrical field, temperature is a limiting factor in the life expectancy of circuit breakers. If temperatures in excess of those for which the circuit breakers have been designed are reached, the insulation used in the circuit breaker degrades, and deterioration of the contacting members (i.e. contacts) occurs. By monitoring the temperature of a circuit breaker, appropriate action can be taken to ensure that the temperature of the circuit breaker does not exceed the design (or rated) limits.

Direct measurement of the temperature of the contacts of a circuit breaker is not always possible, particularly when high voltages are involved and the integrity of the circuit breaker insulation must be maintained. Accordingly, some type of indirect temperature monitoring must be devised to handle situations of this type. It is an object of the present invention to provide means for indirectly monitoring the temperature of electrical switching devices.

SUMMARY OF THE INVENTION

A circuit for monitoring the temperature of the contacts of an electrical switching device, according to this invention, comprises an electrical analogue circuit of the thermal characteristics of the switching device to be monitored. The analogue circuit comprises electrical resistance and capacitance, interconnected so as to form an electrical model of the heat flow paths and capacitances, respectively, in the circuit breaker. In the preferred embodiment of this invention, there is also provided a temperature sensing device to sense the temperature of the exterior of the switching device and introduce to the analogue circuit a voltage signal, the magnitude of which is proportional to the exterior temperature. The analogue circuit is connected in a series circuit relationship with a current controller. The current controller, as the name implies, controls the amount of current flowing through the analogue circuit. The current controller is in turn controlled by a voltage control signal the magnitude of which is proportional to the amount of current being carried by the circuit breaker. The current controller is operated in such a fashion that the current it lets flow through the analogue circuit is proportional to the square of the voltage control signal.

Expressed in another way, the present invention is a circuit for monitoring the temperature of the contacts of an electrical switching device, the circuit comprising: an electrical, resistance-capacitance analogue circuit of the thermal system of the switching device; at least one switch for modifying the analogue circuit to account for different methods of cooling the switching device; a current controller in series circuit relationship with the analogue circuit for controlling the flow of current through the analogue circuit; a load sensing means, both for obtaining a control signal that is proportional to the magnitude of the current conducted by the switching device, and for applying the signal to the controller for controlling the current conduction thereof; and at least one voltage level detector connected across the capacitance of the analogue circuit for measuring the voltage level thereof, the voltage level being representative of the temperature of the contacts of the switching device.

BRIEF DESCRIPTION OF THE DRAWINGS

The preferred embodiment of this invention will be described in more detail with reference to the accompanying drawings, in which:

FIG. 3 is a simplified schematic of the preferred embodiment of the invention.

DESCRIPTION OF THE PREFERRED EMBODIMENTS

Figure 1:
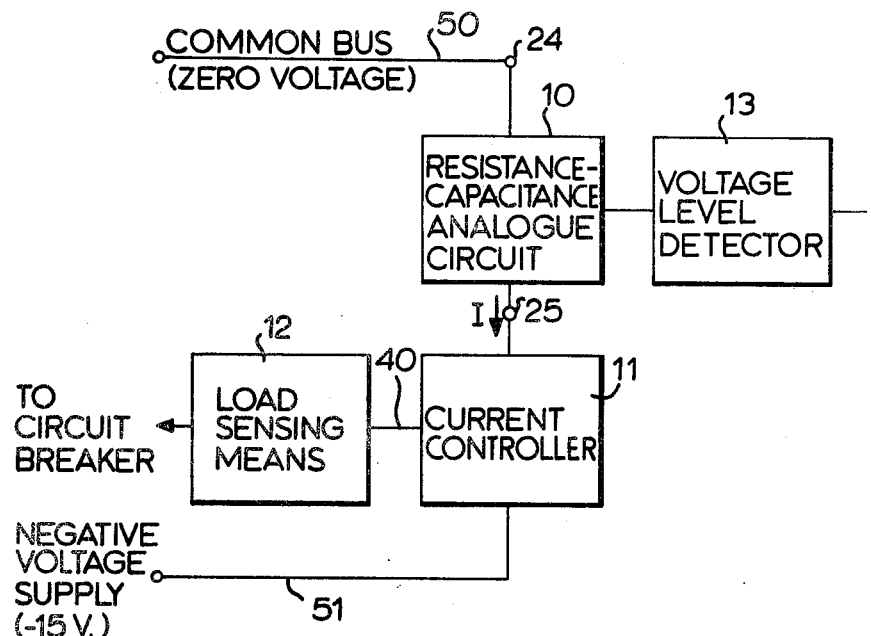
FIG. 1 is a block diagram of the invention in simplified form.

FIG. 1 shows a simplified block diagram of the invention comprising a resistance-capacitance analogue circuit 10 connected in a series circuit relationship with current controller 11. Load sensing means 12 is connected to controller 11, and voltage level detector 13 is connected to analogue circuit 10.

Resistance-capacitance analogue circuit 10 is essentially an electrical network comprising capacitance and resistance, and is designed to duplicate electrically the thermal capacitance and resistance, respectively, of the circuit breaker to be monitored. Analogue circuit 10 will be described in more detail in reference to FIGS. 2 and 3.

Current controller 11 (FIG. 1) varies the amount of current that flows through analogue circuit 10. A DC voltage supply (common bus 50 and negative voltage supply 51) is connected across the series connection of analogue circuit 10 and controller 11 to enable a current to flow therethrough. Load sensing means 12 monitors the current (3 phase in this embodiment) flowing through the three-phase circuit breaker (not shown) and produces a negative DC voltage, the magnitude of which is proportional to the highest AC current (i.e. the largest current of the 3 phases). This negative DC voltage is then fed to controller 11 to provide a control signal 40 for controller 11. Current controller 11 is made such that it allows current to pass through itself (and also through analogue circuit 10 since they are in series) at a rate which is proportional to the square of control signal 40 (which, in turn, is proportional to the highest current in the circuit breaker).

Resistance-capacitance analogue circuit 10 is an electrical analogue of the thermal characteristics of the circuit breaker. The current I which passes through analogue circuit 10 (i.e. from terminal 24 to terminal 25) via controller 11, simulates the heating effect of the circuit breaker due to current passing through the breaker. In very simplistic terms, analogue circuit 10 comprises a capacitance to store current and thus represent the heat stored in the circuit breaker, and a resistance in parallel with the capacitance to represent heat loss due to cooling of the circuit breaker. Voltage level detector 13 measures the voltage level (or magnitude) across the capacitance in analogue circuit 10 and gives an indication when the voltage level across the capacitance exceeds a predetermined limit.

Figure 2:
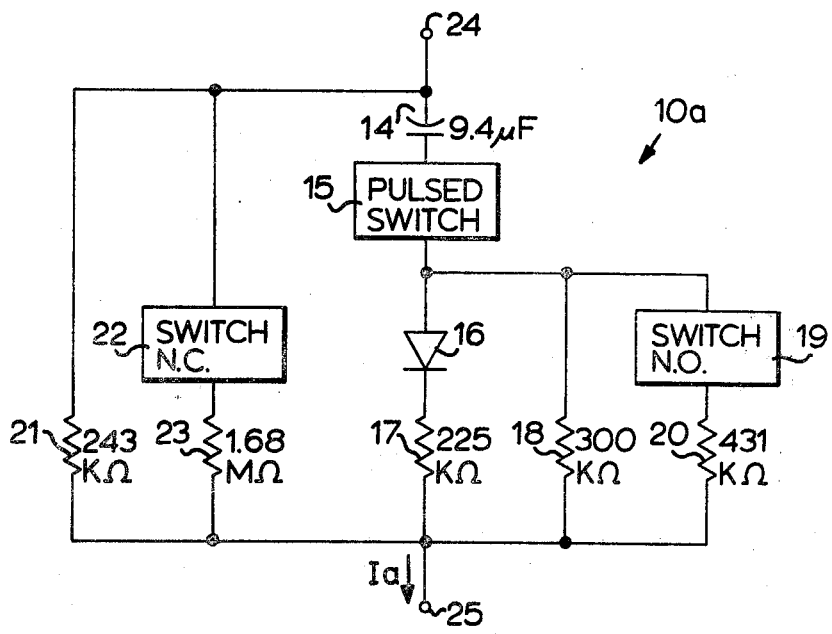
FIG. 2 is a simplified schematic diagram of one possible circuit to be used as the resistance-capacitance analogue in FIG. 1.

FIG. 2 depicts a simplified schematic of one possible capacitance analogue circuit 10, according to this invention, but not the preferred circuit. The circuit 10a of FIG. 2 is simpler than the preferred circuit for analogue circuit 10, so FIG. 2 will be discussed first (note: the numeral 10 is used to refer to the resistance-capacitance analogue circuit in general; numeral 10a is used to refer to one specific embodiment of circuit 10 as shown in FIG. 2; and numeral 10b is used to refer to a second and preferred embodiment of circuit 10 as shown in FIG. 3).

The circuit 10a of FIG. 2 comprises a capacitor 14 connected in series with a pulsed switch 15, a diode 16 and a resistor 17; resistor 18 is in parallel with the series connection of diode 16 and resistor 17. The series circuit connection of switch 19 and resistor 20 is connected in parallel to resistor 18. Resistor 21 is connected in parallel to the series circuit connection of capacitor 14, switch 15, diode 16 and resistor 17. The series circuit of switch 22 and resistor 23 is connected in parallel to resistor 21. Terminal 24 is connected to zero voltage potential (i.e. common bus 50), and terminal 25 is connected to current controller 11.

The effect of circuit 10a is to attempt to duplicate, electrically, the thermal characteristics of a circuit breaker. In this regard, capacitor 14 represents the thermal capacity of the circuit breaker. Since the thermal capacity of the circuit breaker is large, capacitor 14 should also be made large. This is not always convenient to do. In FIG. 2 a smaller capacitor 14 is employed, but its effective capacitance is made much larger by the use of pulsed switch 15. Switch 15 is turned "on" and "off" by a pulse generator (not shown) such that the "off" time is very much greater than the "on" time (e.g. 1000:1). The time constant of circuit 10a is multiplied by this factor (i.e. 1000) and the effective time contant of circuit 10a is thus one thousand times what it would otherwise be without switch 15. The use of a pulsed switch in this manner is known and Canadian Pat. No. 958,082 issued Nov. 19, 1975 by James S. Mark describes this general concept.

The purpose of diode 16 and resistor 17 is to provide for different time constants between heating and cooling of the circuit breaker. When the circuit breaker is heating, a current Ia is flowing through circuit 10a as shown, and diode 16 is biased on and thus conducting with current flowing through resistor 17. During cooling of the circuit breaker, current Ia does not flow, diode 16 is biased off and resistor 17 has no effect on circuit 10a, and thus the effective resistance and the time constant of the circuit increases.

Switches 19 and 22 are used to modify circuit 10a and thereby account for different methods of cooling the circuit breaker. When the circuit breaker is cooled by radiation and natural convection (i.e. not fan cooled) switch 19 is normally open (marked N.O. in FIG. 2) and switch 22 is normally closed (marked N.C. in FIG. 2). When the fan is turned on (which is the case once the circuit breaker reaches a predetermined upper temperature limit) switch 19 closes, and switch 22 opens. Accordingly, both the time constant and the steady state level of circuit 10a are thus adjusted to match the thermal characteristics for both the fan cooling and the non-fan cooling mode of operation.

FIG. 3 is a simplified schematic showing the preferred embodiment of the present invention. FIG. 3 shows the preferred form of resistance-capacitance analogue circuit 10 (the preferred analogue is indicated by the numeral 10b in FIG. 3) connected in a series circuit relationship with current controller 11. The suffix "b" is used in FIG. 3 to refer to those items which have essentially the same function in FIG. 3 as do the same numbered items, less the suffix, in FIG. 2. Load sensing means 12 is shown connected to controller 11 and voltage level detector 13 is shown connected to analogue circuit 10b. Additionally, a Resistance Temperature Detector (RTD) 26, in a series circuit relationship with RTD measurement circuit 27 is connected between the common bus 50 (zero voltage potential) and analogue circuit 10b, as shown in FIG. 3. It can be seen that analogue circuit 10b of FIG. 3 is similar to analogue circuit 10a of FIG. 2. In analogue circuit 10b, capacitor 14b, switch 15b, diode 16b and resistor 17b are all connected in a series circuit relationship. Resistor 18b is parallel to the series connection of diode 16b and resistor 17b. Switch 19b and resistor 20b are connected in a series circuit relationship and are in parallel with resistor 18b. However, resistor 21b is connected to RTD measurement circuit 27, unlike resistor 21 (FIG. 2) which was connected directly to the common bus 50. The series circuit connection of resistor 23b and 22b is in parallel with resistor 21b and a diode 28 is connected from the junction of switch 15b and diode 16b to RTD measurement circuit 27, with the polarity as indicated in FIG. 3.

Analogue circuit 10b functions in much the same manner as did analogue circuit 10a is that now switch 22b and resistor 21b are connected to RTD measurement circuit 27 rather than to the common bus 50. Additionally, diode 28 has been inserted. Diode 28 is used so that when power is applied to analogue 10b, capacitor 14b rapidly charges to the voltage at the output of RTD measurement circuit 27. This provides an "instant on" feature.

The operation of RTD 26 and RTD measurement circuit 27 is known in the art, so that they will not be discussed in much detail. Canadian Pat. No. 962,088 issued Feb. 4, 1975 to D. R. Boothman and D. W. Nutt shows temperature measurement circuits of this general type. RTD 26 is basically a resistance, such as a bar of copper, which changes its resistance, approximately linearly, with temperature. RTD measurement circuit 27 acts as a current "sink" to allow current to flow from the common bus 50 via RTD 26 to circuit 27 and eventually to the negative voltage supply 51. Additionally, circuit 27 measures the voltage drop across RTD 26 to get a measurement of the resistance of RTD 26 and consequently an indication of the temperature of RTD 26. The output of circuit 27 is a negative DC voltage (relative to the common bus 50) the magnitude of which is proportional to the temperature of RTD 26. For the circuit of FIG. 3, the output of circuit 27 was designed so that zero volts corresponds to 0° C., −1 volt corresponds to + 20° C and the voltage output of circuit 27 is approximately linear with respect to temperature.

Attention will now be directed to current controller 11 which is connected in series with resistance-capacitance analogue circuit 10b between the common bus 50 and the negative voltage supply 51. As has been stated previously, current controller 11 regulates the current $I_b$ flowing through itself, from the common bus 50, via analogue circuit 10b to the negative voltage supply 51. Controller 11 regulates the current $I_b$ such that current $I_b$ is proportional to the square of the largest current sensed by load sensing means 12.

As can be seen from FIG. 3, controller 11 comprises three operational amplifiers 29, 30 and 31. The outputs of these amplifiers are connected to the bases of transistors 32, 33 and 34 respectively, as shown in the Figure. The collectors of transistors 32, 33 and 34 are joined together and are connected to terminal 25 which is in turn connected to resistor 18b of analogue circuit 10b. The emitter of transistor 32 is connected to the negative voltage supply 51 via resistor 35. Also, the emitter of transistor 32 is connected to the inverting (−) input of amplifier 29.

The emitter of transistor 33 is connected to the negative voltage supply 51 via resistor 36. The emitter of transistor 33 is also connected to the inverting (−) input of amplifier 30. The inverting (−) input of amplifier 30 is additionally connected, via resistor 37, to the common bus 50. The emitter of transistor 34 is connected to the negative voltage supply 51 via resistor 38. The emitter of transistor 34 is also connected to the inverting (−) input of amplifier 31. The inverting (−) input of amplifier 31 is also connected, via resistor 39, to the common bus 50. The non-inverting (+) inputs of each amplifier 39, 30 and 31 are connected together and are connected to load sensing means 12 so as to receive a control signal 40 indicative of the maximum current flowing through any phase of the circuit breaker.

Current controller 11 responds to signal 40 in such a fashion that initially only transistor 32 is conducting current, and transistors 33 and 34 are biased into the "off" state and are not conducting current. Transistor 32 remains the only transistor in controller 11 to conduct current until signal 40 reaches a level indicative of the circuit breaker carrying 0.7 times its rated capacity (rated capacity is 2500 amp., non-fan cooled, for this embodiment). At that point, transistor 33 also begins to conduct and both transistors 32 and 33 are conducting, while transistor 34 remains biased "off" and non-conducting. When signal 40 reaches a level indicative of the circuit breaker carrying 1.2 times its rated capacity, transistor 34 also begins to conduct and all three transistors (i.e. transistors 32, 33 and 34) of controller 11 are conducting current. As stated previously, the effect thus produced by controller 11 is to have current $I_b$ approximately proportional to the square of control signal 40. Control signal 40 is in turn approximately proportional to the largest current carried by any one phase of the circuit breaker. Such approximations are reasonably accurate up to approximately 3 times the circuit breaker's rated current capacity.

Load sensing means 12 monitors the current through each phase of the three phase circuit breaker and produces a single output, control signal 40, approximately proportional to the largest current carried by any one of the three phases of the circuit breaker. Terminal 41 is connected to a current transformer (not shown) which provides a negative voltage signal proportional to the current flowing through one phase of the circuit breaker. Terminals 42 and 43 are similarly each connected to current transformers (not shown) which provide negative voltage signals proportional to the current flowing through each of the remaining two phases of the circuit breaker.

Terminals 41, 42 and 43 are connected to the cathodes of diodes 44, 45 and 46 respectively. The anodes of diodes 44, 45 and 46 are connected together and are connected to one end of resistor 47. The other end of resistor 47 is connected to the anode of zener diode 48; the cathode of zener diode 48 is connected to the negative voltage supply 51. Electrolytic capacitor 49 is connected in a parallel circuit relationship to diode 48 with the polarities as indicated in the Figure. The series connection of resistor 52 and potentiometer 53 is connected in parallel to capacitor 49. The moveable contact 54 of potentiometer 53 carries connctrol signal 40 to current controller 11.

Briefly stated, diodes 44, 45 and 46 maintain capacitor 49 with a voltage proportional to the largest current flowing through any one of the phases of the circuit breaker. Diode 48 serves as a means of protecting the electronic circuitry from high voltage transients which may be present in an industrial environment. Zener diode 48 limits the maximum magnitude of the voltage input to current controller 11. The series circuit of resistor 52 and potentiometer 53 serves as a voltage divider and contact 54 can be varied so as to provide an adjustment to set the magnitude of control signal 40.

Turning now to voltage level detector 13, it can be seen that detector 13 comprises an operational amplifier 55, level detector 56 and level detector 57. Operational amplifier 55 has its non-inverting (+) input connected to the junction of capacitor 14b and switch 15b. The output of amplifier 55 is connected back to its inverting (−) input. The purpose of amplifier 55 is to act as a "buffer" with a very high input impedance so that the voltage across capacitor 14b can be monitored with a negligible influence. The output amplifier 55 is also connected both to level detector 56 and to level detector 57. Level detector 56 monitors the voltage level (or magnitude) across capacitor 14b, via amplifier 55, and produces an output signal 58 when the magnitude of the voltage across capacitor 14b reaches a predetermined first level, and accordingly, the temperature of the contacts of the circuit breaker has reached a first predetermined level. In the present embodiment, signal 58 is used to commence the operation of a fan to cool the circuit breaker. As can be seen from the figure, output signal 58 is also connected to switches 19b and 22b. This is done so that resistance-capacitance analogue circuit 10b can be modified so as to account for the fan cooling. When signal 58 causes the fan to start, it also causes switch 19b to close and switch 22b to open, and thereby modify analogue circuit 10b to account for fan cooling.

Level detector 57 operates in a similar fashion to detector 56, but detector 57 is set to produce an output signal 59 when the magnitude of the voltage across capacitor 14b reaches a predetermined second level which is greater in magnitude than the first level detected by detector 56. This second level indicates that the contacts of the circuit breaker are at a temperature in excess of their rated maximum and corrective action should be taken.

The foregoing has been a description of the preferred embodiment of the present invention, as envisioned by the inventors, for the application of the invention to a circuit breaker. It is to be understood that the component values as given in this specification are for one specific application of the invention only, and different values can be employed depending upon the particular application. Accordingly, the component values given herein should not be considered as a limitation of the invention in any manner whatsoever, but rather, considered solely as examples for illustrative purposes.

What I claim as new and desire to secure by Letter Patent of the United States is:

1. A circuit for monitoring the temperature of the contacts of an electrical switching device, said circuit comprising: an electrical, resistance-capacitance analogue circuit of the thermal system of said switching device; at least one switch for modifying said analogue circuit to account for different methods of cooling said switching device; a current controller in series circuit relationship with said analogue circuit for controlling the flow of current through said analogue circuit; a load sensing means, both for obtaining a control signal that is proportional to the magnitude of the current conducted by said switching device, and for applying said signal to said controller for controlling the current conduction thereof; and at least one voltage level detector connected across the capacitance of said analogue circuit for measuring the voltage level thereof, said voltage level being representative of the temperature of the contacts of said switching device.

2. The circuit of claim 1 wherein said current controller functions such that the current passing through it, and consequently also through said analogue circuit, is proportional to the square of said control signal.

3. The circuit of claim 2 further including a temperature sensing device for sensing the temperature of the exterior of said electrical switching device; said temperature sensing device outputs a voltage signal the magnitude of which is proportional to the temperature that it senses, and applies said voltage signal to said analogue circuit.

4. The circuit of claim 2 wherein said resistance-capacitance analogue circuit comprises a capacitor connected in a first series circuit relationship with a pulsed switch for increasing the time constant of said analogue circuit, a diode, and a first resistor; said first series circuit is connected in parallel to a second series circuit comprised of a second resistor connected in series with a first switch, for altering said analogue circuit depending upon the mode of cooling said switching device; said third series being connected in parallel to the series connection of said diode and said first resistor of said first series circuit.

5. The circuit of claim 4 wherein said first switch is closed when said second switch is open; and said first switch is open when said second switch is closed.

6. The circuit of claim 3 wherein said resistance-capacitance analogue circuit comprises a capacitor connected in a first series circuit relationship with a pulsed switch for increasing the time constant of said analogue circuit, a diode, and a first resistor; said first series circuit is connected in parallel to a second series circuit comprised of a second resistor connected in series with a first switch, for altering said analogue circuit depending upon the mode of cooling said switching device, an RTD measurement circuit, and an RTD; a third series circuit comprised of a third resistor connected in series with a second switch, for altering said analogue circuit depending upon the mode of cooling said switching device; said third series circuit being connected in parallel to the series connection of said diode and said first resistor of said first series circuit.

7. The circuit of claim 6 wherein said first switch is closed when said second switch is open; and said first switch is open when said second switch is closed.

8. A circuit for monitoring the temperature of the contacts of a circuit breaker, said circuit comprising: an electrical, resistance-capacitance analogue circuit of the thermal system of said circuit breaker; at least on switch for modifying said analogue circuit to account for different methods of cooling said switching device; a current controller in series circuit relationship with said analogue circuit for controlling the flow of current through said analogue circuit; a load sensing means, both for obtaining a control signal that is proportional to the current conducted by said circuit breaker, and for applying said signal to said current controller; said current controller functions such that the current passing through it, and consequently also through said analogue circuit, is proportional to the square of said control signal; and at least one voltage level detector connected across the capacitance of said analogue circuit for measuring the voltage level thereof, said voltage level being representative of the temperature of the contacts of said circuit breaker.

9. The circuit of claim 8 further including a temperature sensing device for sensing the temperature of the exterior of said circuit breaker; said temperature sensing device outputs a voltage signal, the magnitude of which is proportional to the temperature that it senses, and applies said voltage signal to said analogue circuit.

10. The circuit of claim 9 wherein said resistance-capacitance analogue circuit comprises a capacitor connected in a first series circuit relationship with a diode, a first resistor, and a pulsed switch for increasing the time constant of said analogue circuit; said first series circuit is connected in parallel to a second series circuit comprised of a second resistor connected in series with a resistance temperature detector measurement circuit, a resistance temperature detector, and a first switch, for altering said analogue circuit depending upon the mode of cooling said circuit breaker; a third series circuit comprised of a third resistor connected in series with a second switch, for altering said analogue circuit depending upon the mode of cooling said circuit breaker; said third series circuit being connected in parallel to the series connection of said diode and said first resistor of said first series circuit.

* * * * *